United States Patent
Ye et al.

(10) Patent No.: US 8,526,882 B2
(45) Date of Patent: Sep. 3, 2013

(54) DATA TRANSMISSION DEVICE, SYSTEM AND METHOD USING THE SAME

(75) Inventors: Zhou Ye, Taipei (TW); Pel-Chuan Liu, Taipei (TW)

(73) Assignee: Cywee Group Limited, Tortola (VG)

( * ) Notice: Subject to any disclaimer, the term of this patent is extended or adjusted under 35 U.S.C. 154(b) by 238 days.

(21) Appl. No.: 12/963,245

(22) Filed: Dec. 8, 2010

(65) Prior Publication Data

US 2011/0237189 A1   Sep. 29, 2011

(30) Foreign Application Priority Data

Mar. 26, 2010   (TW) ................................ 99109126 A (51) Int. Cl.
   *H04B 7/00*   (2006.01)
(52) U.S. Cl.
   USPC .......................... 455/41.2; 455/3.05; 455/41.1
(58) Field of Classification Search
   USPC . 455/3.05, 41.1, 41.2, 88, 412.1; 375/240.25
   See application file for complete search history.

(56) References Cited

U.S. PATENT DOCUMENTS

| | | | | |
|---|---|---|---|---|
| 7,957,628 | B2 * | 6/2011 | Mizutani | 386/356 |
| 2004/0072584 | A1 * | 4/2004 | Kern | 455/466 |
| 2011/0179196 | A1 * | 7/2011 | Friedman | 710/22 |

* cited by examiner

*Primary Examiner* — Tuan H Nguyen
(74) *Attorney, Agent, or Firm* — Ding Yu Tan (57) ABSTRACT

A data transmission device connected to a monitor includes a wireless transmission module, a multimedia processing unit and an output interface. The wireless transmission module wirelessly receives a multimedia data transmitted by an electronic apparatus. The multimedia processing unit receives and decompresses and decodes the multimedia data, and the output interface transmits the multimedia data to the monitor for displaying the multimedia data. The display area of the monitor is larger than the display area of the display unit of the electronic apparatus. A user is allowed to watch the multimedia data generated from the electronic apparatus executing a multimedia file on the monitor with a large display area.

14 Claims, 7 Drawing Sheets

DATA TRANSMISSION DEVICE, SYSTEM AND METHOD USING THE SAME

BACKGROUND OF THE INVENTION

1. Field of the Invention

The invention generally relates to a data transmission system, in particular to a data transmission device, and method using the same.

2. Description of Prior Art

With the advancement of the semiconductor industry, the physical size of various electronic devices is greatly reduced. Along with the rapid expansion of wireless networks, data transmission and reception are made more convenient. As a result, portable electronic devices (often referred to as handheld electronic devices) such as a mobile phone, MP3 player and Personal Digital Assistant (PDA) are becoming mainstream in the electronic products market and indispensable in everyday life.

Portable electronic devices, with their compact size, are easy to carry yet provide limited display areas. Given many electronic devices support multimedia data playback functions, it is not comfortable to watch multimedia data with the small display on portable devices. Therefore, users are not accustomed to watching movies or television programs on portable electronic devices because images must be shrunk, rendering details, especially subtitles, almost indistinguishable. Therefore, it is difficult for users to enjoy watching multimedia data played on these types of electronic devices.

Recently, the demand for portable electronic devices has increased. There are many game developers starting to develop games playable on portable electronic devices. Despite this desire, compact display area remains a critical factor in whether a user can fully enjoy playing a game while maintaining good control of a game. It is possible that the game has potential to be popular yet is not accepted by the general public.

Further, a user may play these multimedia data or execute computer games on a notebook computer or a desktop computer. Nonetheless, it is more enjoyable to watch multimedia data on a large display screen than on a personal computer screen. Also, the user is required to sit next to a notebook computer or a desktop computer when watching multimedia data or executing computer games.

To sum up, it is desirable to provide technology compatible with designs of current portable electronic devices for transmitting multimedia data in various portable electronic devices or computers to a player with a large display area via wireless transmission and displaying the multimedia data on that player.

SUMMARY OF THE INVENTION

The objective of the present invention is to provide a data transmission device, system and method for receiving a multimedia data generated by an electronic apparatus and wirelessly transmitting the multimedia data to a display monitor.

To achieve the above objective, the data transmission device of the present invention is connected to a monitor. The data transmission device mainly comprises a wireless transmission module, a multimedia processing unit and an output interface. The wireless transmission module wirelessly receives multimedia data transmitted by the electronic apparatus. The multimedia processing unit receives and decompresses and decodes the multimedia data, and the output interface transmits the multimedia data to the monitor for displaying the multimedia data.

Compared to prior art, the advantages provided by the present invention are that the audio data and video data generated by the electronic apparatus executing the multimedia file are allowed to be wirelessly transmitted to a monitor with a larger display area. Also, a command stream sent by a remote external controller is transmitted to the electronic apparatus via the data transmission device for controlling the multimedia file execution. Thus, a user is allowed to control the electronic apparatus without being next to the electronic apparatus and watch the multimedia data generated by the electronic apparatus executing the multimedia file. In addition, the data transmission device of the present invention also provides features such as low power consumption, compact size and mobility, which makes the present invention useful in everyday life.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent, variation and modification made according to appended claims is all covered by the claims claimed by the present invention.

Figure 1:
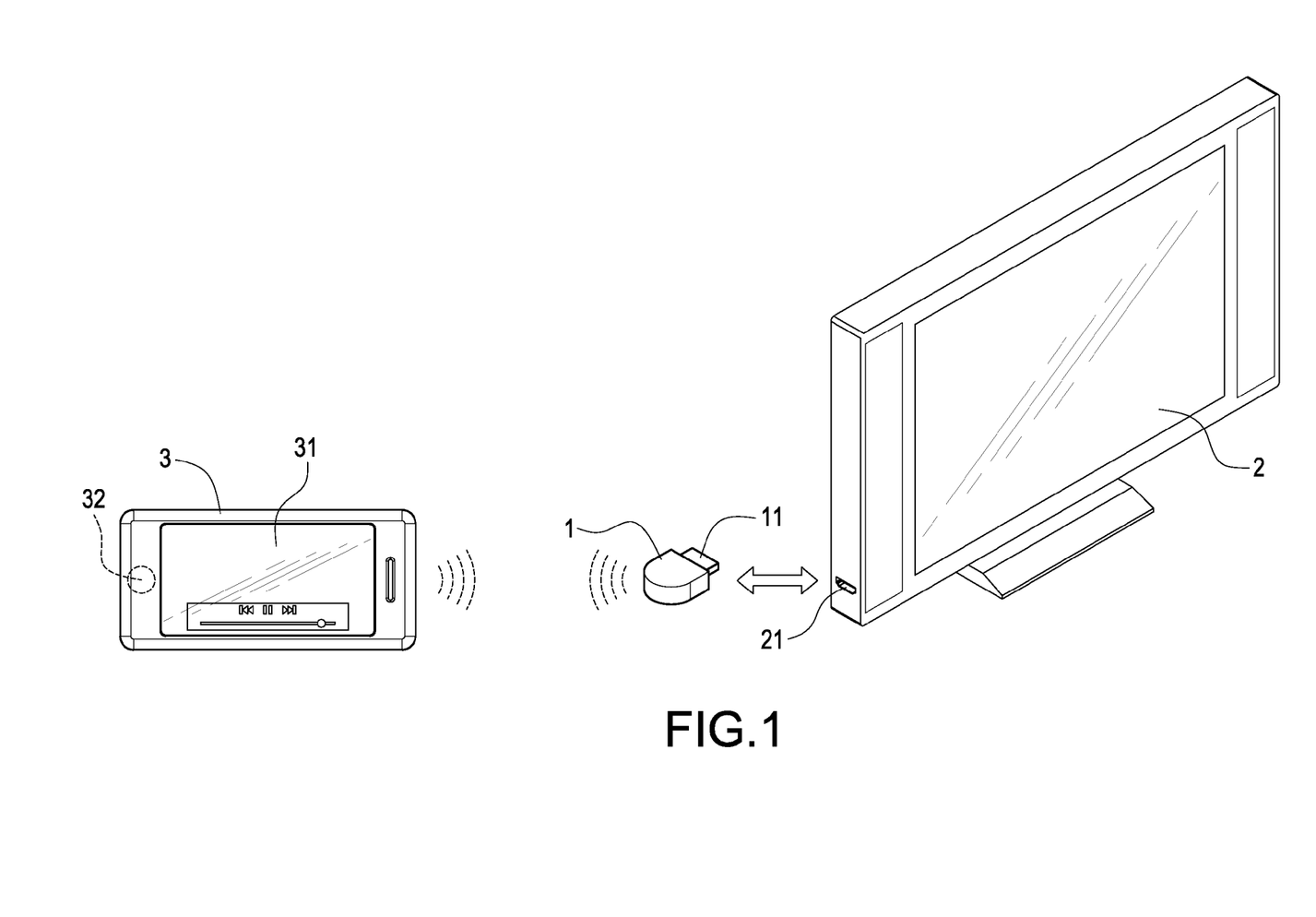
FIG. 1 is a schematic diagram illustrating a preferred embodiment of the data transmission device according to the present invention.

FIG. 1 is a schematic diagram illustrating a preferred embodiment of the data transmission device according to the present invention. As shown in the diagram, a data transmission device 1 of the present invention wirelessly transmits data between an external monitor 2 and an external electronic apparatus 3. The data transmission device 1 is connected via an output interface 11 to the monitor 2 having an interface port 21 identical to the output interface 11, whereby the data transmission device 1 transmits received data to the monitor 2. Also, the data transmission device 1 receives power from the monitor 2 via the output interface 11. Thus the data transmission device 1 is not required to have an internal power supply, which is useful in both reducing the dimension of the data transmission device 1 and makes the data transmission device 1 convenient to transport. The output interface 11 is a High Definition Multimedia Interface (HDMI) port. The interface port 21 is a HDMI interface port 21. The output interface 11 is interconnected to the monitor and adapts to an HDMI standard but not limited by the embodiment. The electronic apparatus 3 is a portable electronic apparatus 3 such as a mobile phone, Personal Digital Assistant (PDA), handheld gaming machine, etc. The electronic apparatus 3 is mainly used for executing a multimedia file such as a movie file, music file, computer game file, etc. Also, the multimedia file is displayed via a display 31 and a speaker 32 of the electronic apparatus 3 upon execution of the multimedia file.

The electronic apparatus 3 generates multimedia data P1, for example, the multimedia data P1 comprises audio data, video data, and etc., generated from the electronic apparatus 3 executing the multimedia file. The generated multimedia data P1 is wirelessly transmitted to the data transmission device 1 via a wireless transmission module (not shown) configured in the electronic apparatus 3. Thus, the multimedia data P1 is transmitted via the data transmission device 1 to the monitor 2 for displaying the multimedia data P1. The monitor 2 has a display area larger than that of the display 31 of the electronic apparatus 3. Therefore, a user may use the electronic apparatus 3 for executing the multimedia file correlated to the multimedia data P1 and watching the multimedia data P1 generated from the electronic apparatus 3 executing the multimedia file on the monitor 2 having larger display area.

Figure 2:
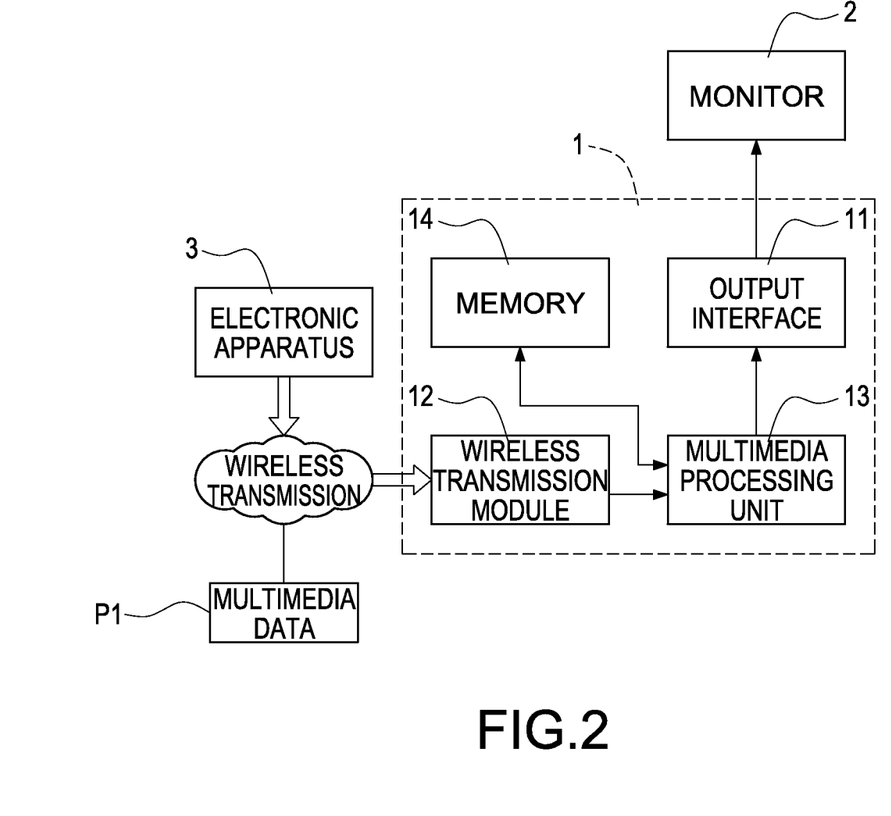
FIG. 2 is a block diagram illustrating a preferred embodiment according to the present invention.

FIG. 2 is a block diagram illustrating a preferred embodiment according to the present invention. As shown in the diagram, the data transmission device 1 mainly comprises the output interface 11, a wireless transmission module 12 and a multimedia processing unit 13. The electronic apparatus 3 encodes and compresses the generated multimedia data P1 via an internal processor (not shown) and transmits the encoded and compressed multimedia data P1 to the data transmission device 1 via a wireless transmission. The data transmission device 1 is wirelessly communicated with the electronic apparatus 3 via the wireless transmission module 12 for receiving the multimedia data P1. The wireless transmission module 12 adapts to IEEE802.11 communication protocol and establishes a wireless connection with the electronic apparatus 3 via a Wireless Fidelity (WIFI) system, but the scope of the invention is not limited to this embodiment.

The multimedia processing unit 13 is electrically connected to the wireless transmission unit 12 for receiving the multimedia data P1. The multimedia data P1 is decompressed and decoded by the multimedia processing unit 13 for recovering the multimedia data P1 to original form before the multimedia data P1 was encoded and compressed. The output interface 11 is electrically connected to the multimedia processing unit 13, the multimedia data P1 is converted in accordance with a display specification of the monitor 2 by the output interface 11, and then transmitted to the monitor 2 for playing the multimedia data P1. Moreover, the display specification of the monitor 2 comprises a high resolution display, but not intent to limited. It should be noted that the data transmission device 1 further comprises a memory 14 electrically connected to the multimedia processing unit 13 and configured to be a buffer for the decompressing and decoding of the multimedia data P1. This design has benefits such as increasing the compression ratio of the multimedia data P1 and lowering the bandwidth required for the wireless transmission. The memory 14 is a Synchronous Dynamic Random Access Memory (SDRAM) for example, but the scope of this invention is not limited to this particular embodiment.

Figure 3:
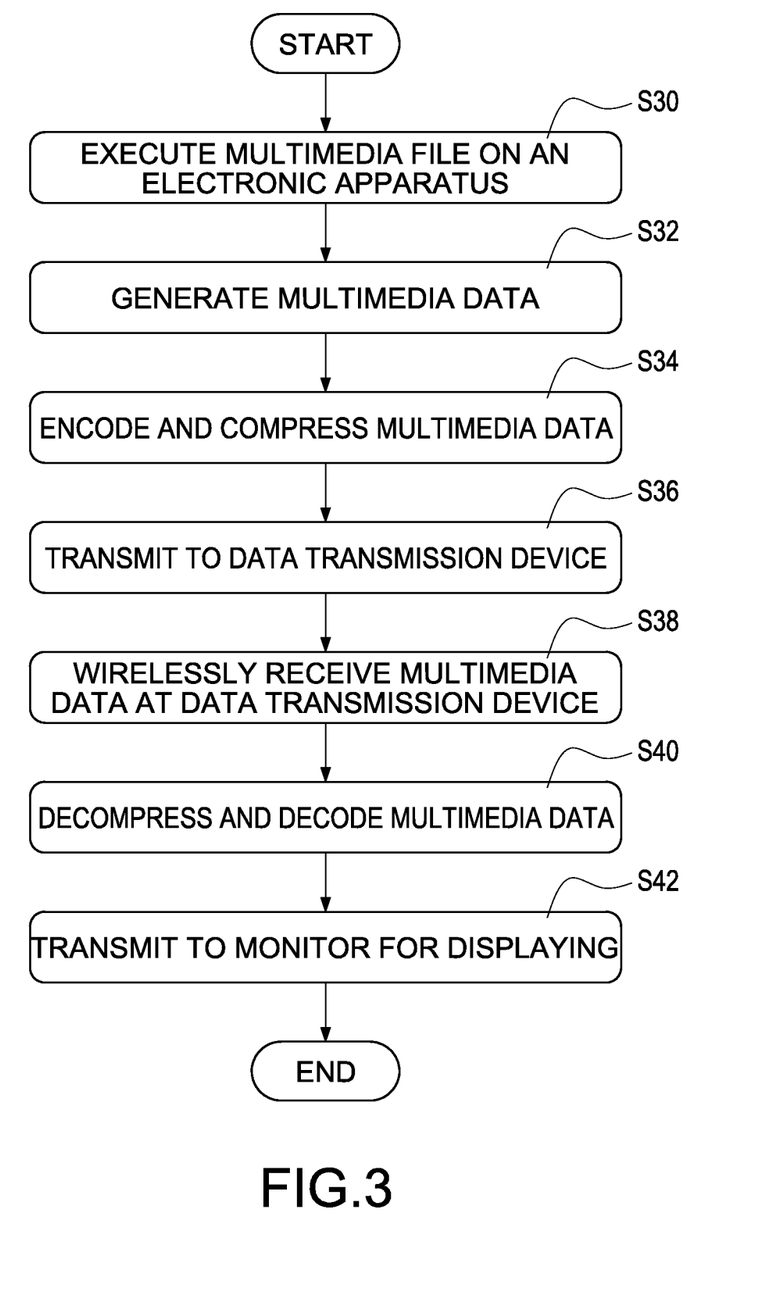
FIG. 3 is a flow chart illustrating data transmission in a preferred embodiment according to the present invention.

FIG. 3 is a flow chart illustrating data transmission in a preferred embodiment according to the present invention.

Firstly, the user executes a multimedia file on the electronic apparatus 3 (step S30). Next, the electronic apparatus 3 generates the multimedia data P1 by executing the multimedia file (step S32). Also, the electronic apparatus 3 encodes and compresses the generated multimedia data P1 (step S34). Lastly, the multimedia data P1 is wirelessly transmitted to the data transmission device 1 by the electronic apparatus 3 (step S36).

The data transmission device 1 wirelessly receives the multimedia data P1 via the wireless transmission module 12 (step S38). Next, the multimedia data P1 is transmitted to the multimedia processing unit 13 for decompressing and decoding (step S40). Lastly, the decompressed and decoded multimedia data P1 is converted and transmitted to the monitor for displaying via the output interface 11 (step S42).

The above embodiment is applied to general executable multimedia files and implemented with an exemplary portable electronic apparatus having a wireless transmission function. However, general desktop computers or entry level notebook computers suitable for word processing purpose are built with simple and low cost configurations and often do not include wireless transmission function. Consequently, the multimedia data P1 cannot be transmitted between the electronic apparatus 3 and the data transmission device 1, thereby preventing the data transmission method with an electronic apparatus 3 having the above limited configurations. Considering the limitation, the inventor also provides a data transmission system based on the data transmission device 1 and further detailed in the following description.

Figure 4:
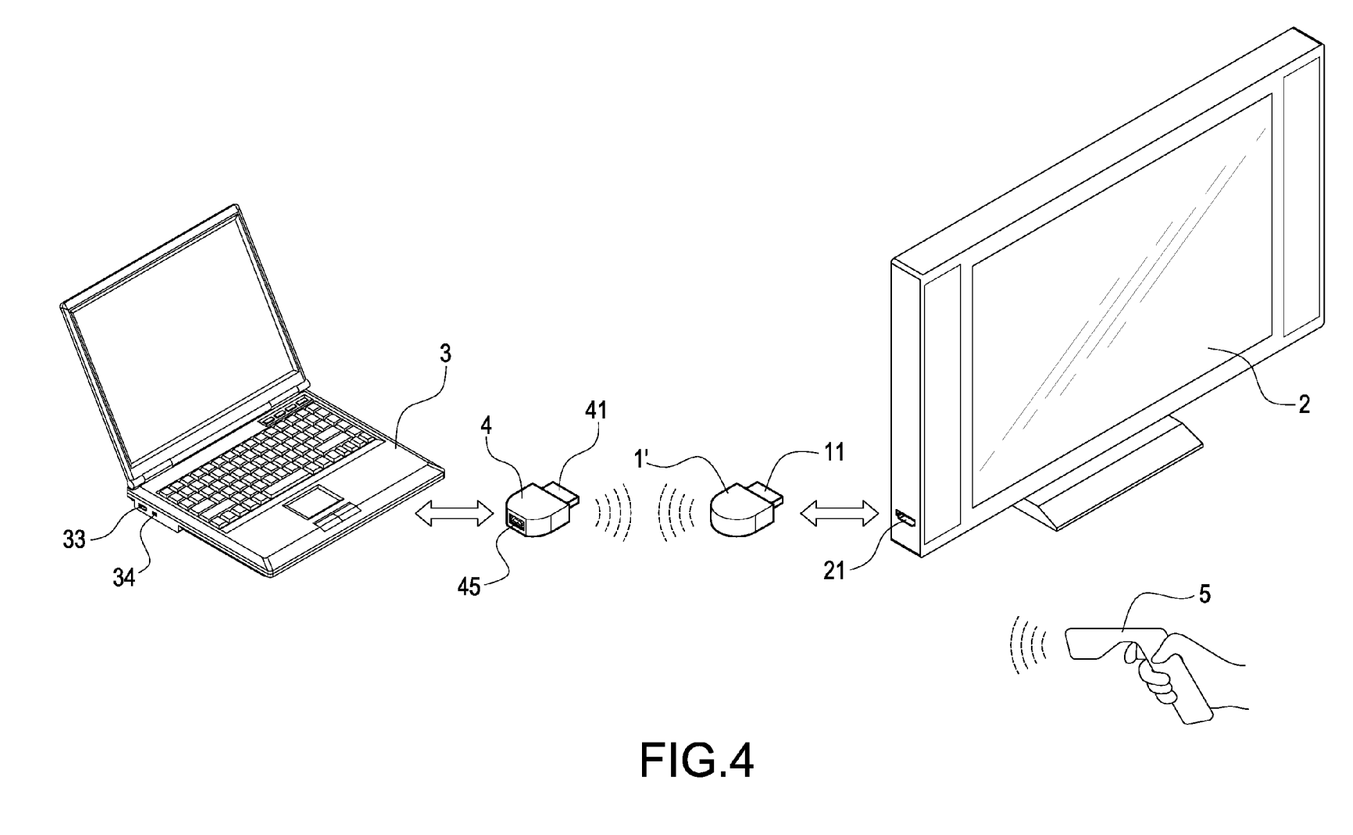
FIG. 4 is a schematic diagram illustrating a preferred embodiment of the data transmission system according to the present invention.

FIG. 4 is a schematic diagram illustrating a preferred embodiment of the data transmission system according to the present invention. The data transmission system of the embodiment comprises a display-end data transmission device 1' (which is identical to the data transmission device 1 and is indicated as the display-end data transmission device 1' in the following embodiment) connected to the monitor 2, and an execution-end data transmission device 4 which is in communication with the display-end data transmission device 1' and connected to the electronic apparatus 3. The display-end data transmission device 1' connects to the interface port 21 of the monitor 2 via the output interface 11. The execution-end data transmission device 4 connects to a multimedia interface port 33 of the electronic apparatus 3 via an input interface 41. The input and output interfaces 11, 41 are HDMI interface ports, adapting to an HDMI standard and transmitting the multimedia data P1 with high speed and receive required working power from the monitor 2 and the electronic apparatus 3, but are not limited to such interface or power source. The execution-end data transmission device 4 further has a receiver 45. The execution-end data transmission device 4 connects with a control interface port 34 of the electronic apparatus 3 via the receiver 45. The execution-end data transmission device 4 receives and transmits an external command stream (for example the command stream C1 in FIG. 5) and then the command stream C1 is transmitted to and processed by the electronic apparatus 3 via the receiver 45 for controlling the electronic apparatus 3 while executing the multimedia file (detailed in the following).

Figure 5:
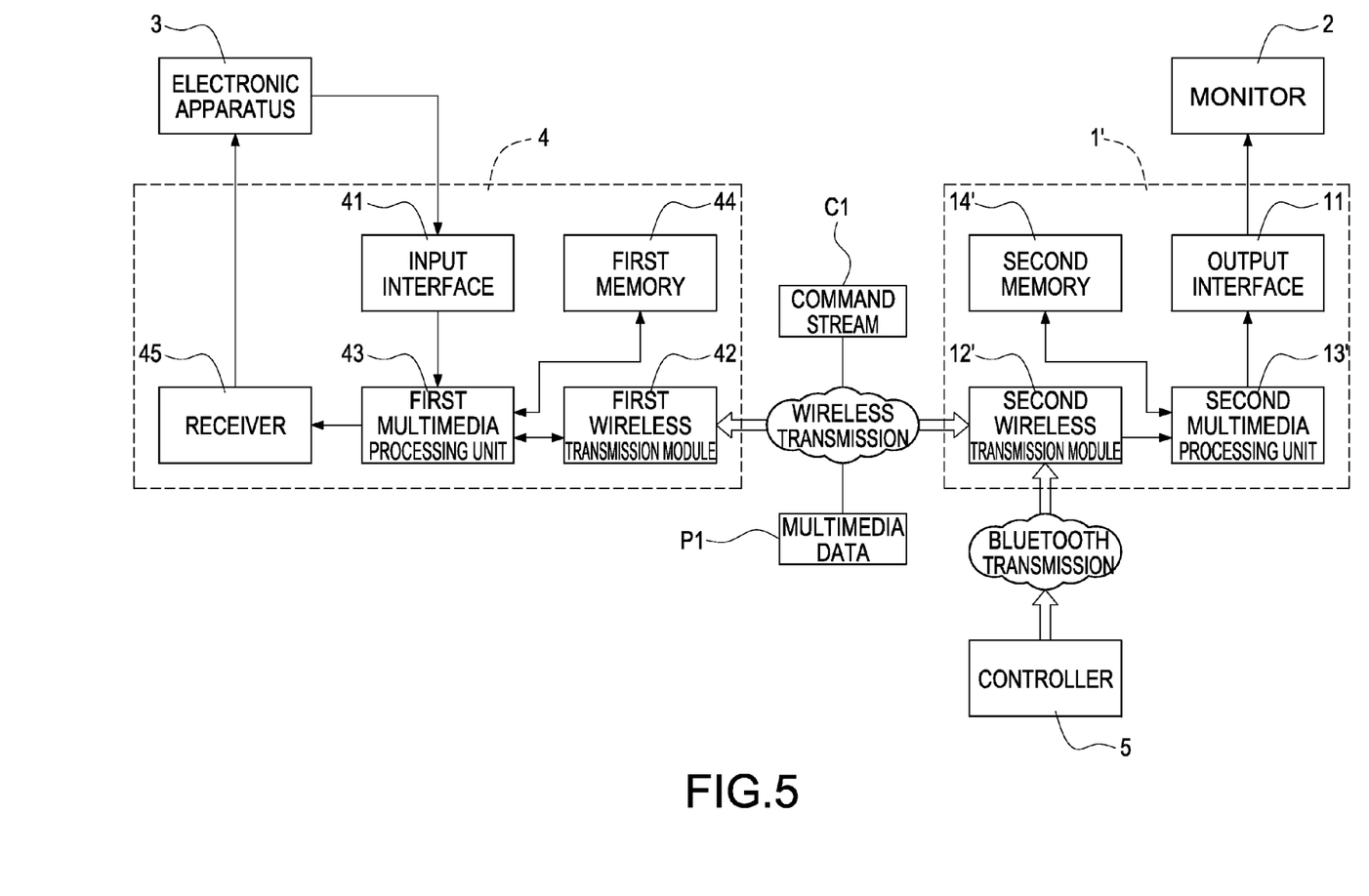
FIG. 5 is a block diagram illustrating another preferred embodiment according to the present invention.

FIG. 5 is a block diagram illustrating another preferred embodiment according to the present invention. As shown in the diagram, the execution-end data transmission device 4 mainly comprises the input interface 41, a first wireless transmission module 42, a first multimedia processing unit 43, a first memory 44 and the receiver 45. The input interface 41 is connected to the electronic apparatus 3 to receive the power required by the execution-end data transmission device 4 and to receive and transmit the multimedia data P1 generated by the electronic apparatus 3. The first multimedia processing unit 43 is electrically connected to the input interface 41 in such a way for receiving the multimedia data P1 received by the input interface 41 and further encoding and compressing the multimedia data P1. The first wireless transmission module 42 is electrically connected to the first multimedia processing unit 43 in such a way for wirelessly receiving and transmitting the encoded and compressed multimedia data P1 to the display-end data transmission device 1'.

The display-end data transmission device 1' is in communication with the execution-end data transmission device 4 and comprises a second wireless transmission module 12', a second multimedia processing unit 13' electrically connected to the second wireless transmission module 12', the output interface 11 electrically connected to the second multimedia processing unit 13' and a second memory 14' electrically connected to the second multimedia processing unit 13'.

The second wireless transmission module 12' wirelessly receives the multimedia data P1 transmitted via the first wireless transmission module 42 of the execution-end data transmission device 4. Following that, the second multimedia processing unit 13' receives the multimedia data P1 and decompresses and decodes the received multimedia data P1. The decompressed and decoded multimedia data P1 is transmitted and converted in accordance with a display specification of the monitor via the output interface 11 coupled to the monitor 2 for displaying said multimedia data P1 on the monitor 2. Moreover, the display specification of the monitor for displaying the multimedia comprises a high resolution display.

The first memory 44 and the second memory 14' are configured to be buffers for compression, decompression, encoding or decoding of the multimedia data P1. The first and second memories 44 and 14' can be, for example, SDRAM. The first wireless transmission module 42 and the second wireless transmission module 12' adapts to IEEE802.11 communication protocol and to establish a wireless connection via WIFI system, but the scope of the invention is not limited to this embodiment.

As mentioned above, the second wireless transmission module 12' further adapts to a Bluetooth profile to wirelessly receive the command stream C1 sent by an external controller 5 (for example a remote controller or a game machine controller). For example, if the display-end data transmission device 1' and the monitor 2 are in a living room and the execution-end data transmission device 4 and the electronic apparatus 3 are in a room far from the living room, the display-end data transmission device 1' receives the command stream C1 via a short distance transmission such as Bluetooth and then transmits the command stream C1 via a long distance transmission such as WIFI system to the first multimedia processing unit 42 of the execution-end data transmission device 4. The execution-end data transmission device 4 transmits the command stream C1 to the electronic apparatus 3 via the receiver 45 for controlling the execution of the multimedia file, for example controlling execution of an electronic game. The receiver 45 and the control interface port 34 adapt to a Universal Serial Bus (USB) standard. Thus, the first multimedia processing unit 42 is configured to receive and convert the command stream C1 to adapt to a USB standard and transmit the converted command stream C1 to the receiver 45, the receiver 45 and the control interface port 34 are interconnected via a USB transmission cable (not shown) to transmit the command stream C1, but the scope of the invention is not limited to utilization of a USB standard.

Figure 6:
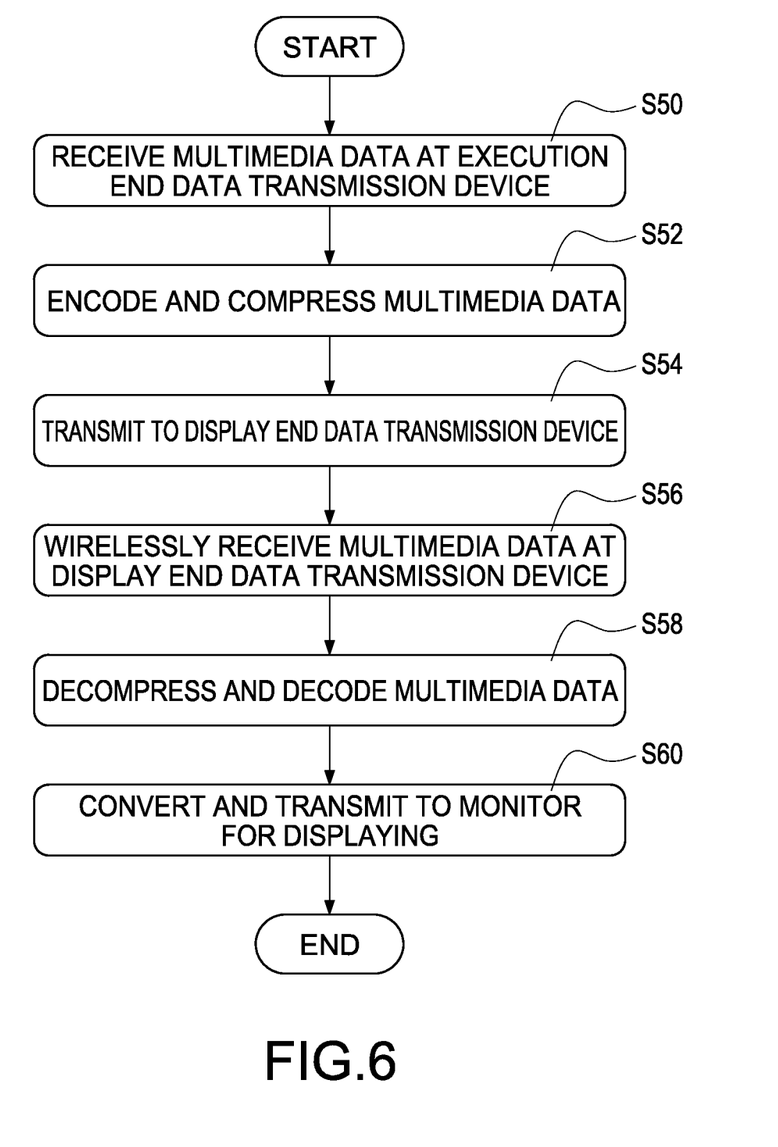
FIG. 6 is a flow chart illustrating data transmission in another preferred embodiment according to the present invention.

FIG. 6 is a flow chart illustrating data transmission in another preferred embodiment according to the present invention. Firstly, the execution-end data transmission device 4 receives the multimedia data P1 generated by the electronic apparatus 3 (step S50). Next, the first multimedia processing unit 43 of the execution-end data transmission device 4 encodes and compresses the generated multimedia data P1 (step S52). Next, the encoded and compressed multimedia data P1 is wirelessly transmitted to the display-end data transmission device 1' via WIFI system (step S54). The display-end data transmission device 1' wirelessly receives the multimedia data P1 via the second wireless transmission module 12' from the first wireless transmission module 42 of the execution-end data transmission device 4 (step S56). Next, the second multimedia processing unit 13' decompresses and decodes the multimedia data P1 (step S58). Lastly, the decompressed and decoded multimedia data P1 is converted in accordance with a display specification of the monitor 2 and transmitted to the monitor 2 for displaying via the output interface 11 (step S60).

Figure 7:
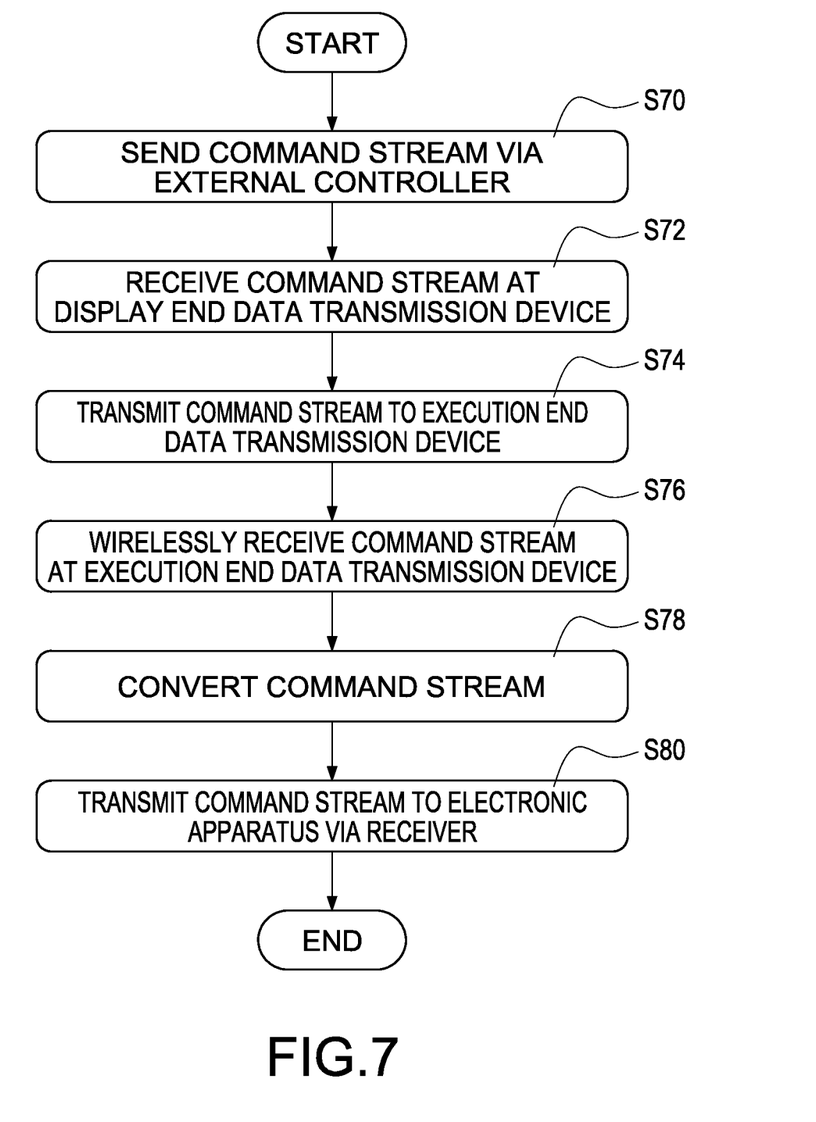
FIG. 7 is a flow chart illustrating instruction transmission in another preferred embodiment according to the present invention.

FIG. 7 is a flow chart illustrating instruction transmission in another preferred embodiment according to the present invention. Firstly, a user sends the command stream C1 via an external controller 5 (step S70). Meanwhile, if the distance between the controller 5 and the display-end data transmission device 1' falls within the supported distance of the Bluetooth profile, the display-end data transmission device 1' wirelessly receives the command stream C1 inputted externally via the second wireless transmission module 12' (step S72), wherein the second wireless transmission module 12' adapts to the Bluetooth profile, and the command stream C1 transmitted adapts to the Bluetooth profile. Next, the second wireless transmission module 12' wirelessly transmits the command stream C1 to the execution-end data transmission device 4 via WIFI system with long distance wireless transmission (step S74).

The execution-end data transmission device 4 wirelessly receives the command stream C1 inputted externally by the display-end data transmission device 1' (step S76). In the present embodiment, the receiver 45 adapts to the USB standard. Therefore, the execution-end data transmission device 4 converts the command stream C1 to adapt to the USB standard by the first multimedia processing unit 43 (step S78). In other embodiment, the execution-end data transmission device 4 may interconnect with the electronic apparatus 3 and convert and transmit the command stream C1 by other communication protocols, the scope of the invention is not limited to the above. Lastly, the execution-end data transmission device 4 transmits the converted command stream C1 to the electronic apparatus 3 via the receiver 45 coupled to the electronic apparatus 3 (step S80). Thus, the command stream C1 is transmitted to and processed by the electronic apparatus 3, and the execution of the multimedia file is controlled by the command stream C1.

It should be noted that if the distance between the controller 5 and the execution-end data transmission device 4 falls within the supported distance of the Bluetooth profile, and the first wireless transmission module 42 adapts to the Bluetooth profile, then the controller 5 can directly transmit the command stream C1 to the first wireless transmission module 42 of the execution-end data transmission device 4. Also, the command stream C1 is then converted to adapt to the USB standard by the first multimedia processing unit 43 and transmitted to the electronic apparatus 3 for displaying by the receiver 45.

As the skilled person will appreciate, various changes and modifications can be made to the described embodiments. It is intended to include all such variations, modifications and equivalents which fall within the scope of the invention, as defined in the accompanying claims.

What is claimed is:

1. A data transmission device for connecting to an external monitor, wirelessly receiving multimedia data and transmitting the multimedia data to the monitor such that the multimedia data is transmitted and displayed on the monitor, said data transmission device comprising: a wireless transmission module for receiving the multimedia data via a wireless transmission; a multimedia processing unit electrically connected to the wireless transmission module for receiving the multimedia data and decompressing and decoding the multimedia data; and an output interface electrically connected to the multimedia processing unit for transmitting and converting the multimedia data in accordance with a display specification of the monitor for displaying said multimedia data, wherein the device further comprises a memory electrically connected to the multimedia processing unit and configured to be a buffer for said decompressing and decoding of the multimedia data.

2. The data transmission device of claim 1, wherein the wireless transmission module adapts IEEE802.11 communication protocol; the output interface is a High Definition Multimedia Interface (HDMI) port; and wherein the output interface is interconnected to the monitor and adapts to a HDMI standard.

3. The data transmission device of claim 1, wherein the display specification of the monitor for displaying said multimedia comprises a high resolution display.

4. The data transmission device of claim 1, wherein the memory is a Synchronous Dynamic Random Access Memory (SDRAM).

5. The data transmission device of claim 1, wherein the multimedia data comprises audio data and video data generated and transmitted from an external electronic apparatus executing a multimedia file.

6. A data transmission system communicating between an external electronic apparatus and an external monitor and for wirelessly receiving and transmitting multimedia data generated from the electronic apparatus executing a multimedia file correlated to said multimedia data to be transmitted to the monitor for displaying said multimedia data on the external monitor, said data transmission system comprising: an execution-end data transmission device electrically connected to the electronic apparatus comprising: an input interface connecting to the electronic apparatus to receive and transmit the multimedia data; a first multimedia processing unit electrically connected to the input interface for receiving, encoding and compressing the multimedia data; and a first wireless transmission module electrically connected to the first multimedia processing unit for wirelessly receiving and transmitting the encoded and compressed multimedia data; a display-end data transmission device in communication with the execution-end data transmission device and electrically connected to the external monitor comprising: a second wireless transmission module for wirelessly receiving the multimedia data transmitted via said first wireless transmission module of the execution-end data transmission device; a second multimedia processing unit electrically connected to the second wireless transmission module for receiving the multimedia data and decompressing and decoding the multimedia data; and an output interface electrically connected to the second multimedia processing unit and coupled to the monitor for transmitting and converting the multimedia data in accordance with a display specification of the external monitor for displaying said multimedia data, wherein the execution-end data transmission device further comprises a receiver electrically connected to the first multimedia processing unit such that the execution-end data transmission device receives a command stream sent from the display-end data transmission device wirelessly; and wherein the execution-end data transmission device converts the command stream received by the receiver thereof such that the command stream is transmitted to and processed by the electronic apparatus, and wherein the command stream transmitted adapts to a Bluetooth profile, the data transmission system further comprising an external controller, and the external controller is wirelessly transmitting the command stream through Bluetooth.

7. The data transmission system of claim 6, wherein the execution-end data transmission device further comprises a first memory electrically connected to the first multimedia processing unit; the display-end data transmission device further comprises a second memory electrically connected to the second multimedia processing unit; and wherein said first and second memories are configured to be buffers for compressing, decompressing, encoding or decoding of the multimedia data.

8. The data transmission system of claim 6, wherein the input and output interfaces are HDMI ports adapting to a HDMI standard; and wherein the first and second wireless transmission modules adapts to IEEE802.11 communication protocol to establish wireless connection via a WIFI system.

9. The data transmission device of claim 6, wherein the display specification of the monitor for displaying said multimedia comprises a high resolution display.

10. The data transmission system of claim 6, wherein the receiver adapts to a Universal Serial Bus (USB) standard.

11. The data transmission system of claim 6, wherein the execution-end data transmission device further comprises a receiver electrically connected to the first multimedia processing unit; and wherein the first wireless transmission module of the execution-end data transmission device adapts to a Bluetooth profile to receive a command stream transmitted thereto; and wherein the first multimedia processing unit is configured to convert said command stream received by the receiver to adapt to a USB standard.

12. A data transmission method for wirelessly transmitting a multimedia data from an electronic device to a monitor to receive and display said multimedia data thereon; wherein said electronic device and the monitor are coupled to an execution-end and a display-end data transmission devices respectively such that the multimedia data is transmitted and communicated between said execution-end and display-end data transmission devices, said method comprising: wirelessly receiving the multimedia data via a second wireless transmission module of the display-end data transmission device; decompressing and decoding the multimedia data at a second multimedia processing unit of the display-end data transmission device; converting and transmitting the multimedia data in accordance with a display specification of the monitor for displaying said multimedia data; generating the multimedia data for transmitting from the execution-end data transmission device of the electronic apparatus to the display-end data transmission device coupled to the monitor; encoding and compressing the multimedia data at a first multimedia processing unit of the execution-end data transmission device; and wirelessly transmitting the multimedia data from a first wireless transmission module of the execution-end data transmission device to the display-end data transmission device.

13. The data transmission method of claim 12, further comprising the steps of: receiving a command stream inputted externally to the display-end data transmission device; transmitting the command stream to the execution-end data transmission device; converting the command stream adapting to a USB standard by the first multimedia processing unit of the execution-end data transmission device; and transmitting the command stream to the electronic apparatus via a receiver coupled to the electronic apparatus of the execution-end data transmission device.

14. The data transmission method of claim 12, further comprising the step of: receiving a command stream inputted externally to the execution-end data transmission device via the first wireless transmission module thereof; converting the command stream adapting to a USB standard; and transmitting the command stream to the electronic apparatus via a receiver coupled to the electronic apparatus of the execution-end data transmission device.

* * * * *